United States Patent [19]
Cole

[11] 3,931,608
[45] Jan. 6, 1976

[54] CABLE DEPTH CONTROL APPARATUS
[75] Inventor: Jimmy R. Cole, Houston, Tex.
[73] Assignee: Syntron, Inc., Houston, Tex.
[22] Filed: Apr. 25, 1974
[21] Appl. No.: 463,980

[52] U.S. Cl. ............ 340/7 PC; 114/235 B; 340/3 T
[51] Int. Cl.² ........................................... G01V 1/28
[58] Field of Search ........ 340/7 PC, 3 T; 114/235 B

[56] References Cited
UNITED STATES PATENTS

| | | | |
|---|---|---|---|
| 3,412,704 | 11/1968 | Buller et al. | 340/7 PC |
| 3,531,762 | 9/1970 | Tickell | 340/7 PC |
| 3,673,556 | 6/1972 | Biggs | 340/7 PC |

Primary Examiner—Maynard R. Wilbur
Assistant Examiner—H. A. Birmiel
Attorney, Agent, or Firm—Pravel & Wilson

[57] ABSTRACT

An apparatus to control the depth in the water of a cable, such as a cable streamer of seismic geophones or hydrophones towed behind an exploration boat during seismic surveys of submerged formations, and maintain the cable at a desired depth while operating at reduced noise levels and with improved operating characteristics. The depth at which the cable is maintained may be adjusted for a range of selected depths.

12 Claims, 6 Drawing Figures

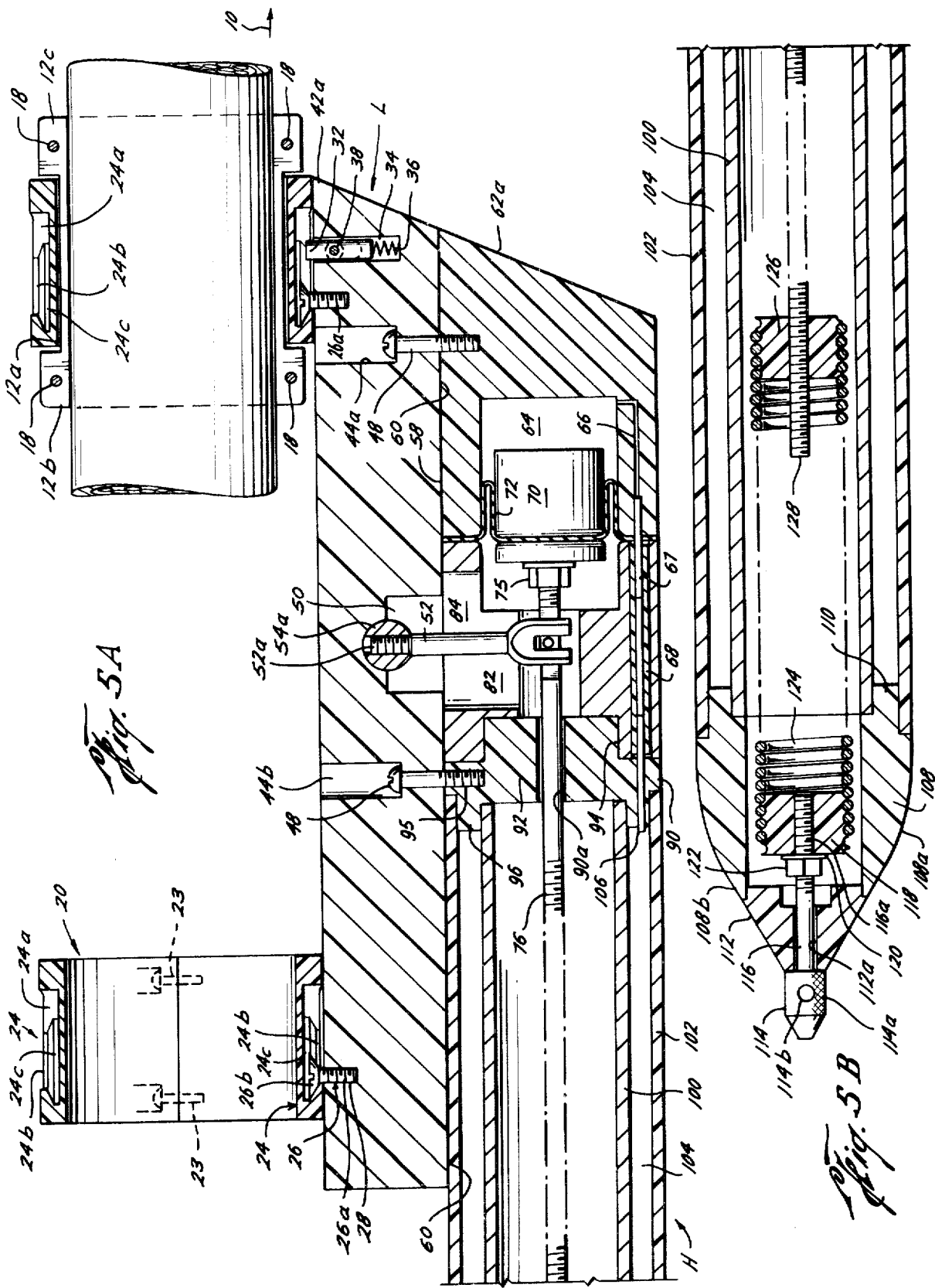

CABLE DEPTH CONTROL APPARATUS

BACKGROUND OF THE INVENTION

1. Field of the Invention

The present invention relates to an apparatus for controlling the depth of a cable, such as a seismic hydrophone streamer, in water.

2. Description of the Prior Art

Beginning with early attempts to control the depth of submerged seismic cables during exploration, such as a single drogue assembly drawn behind the cable in U.S. Pat. No. 2,465,696, or the spaced weights and floats of U.S. Pat. No. 2,729,300, considerable effort has been expended to accurately control the cable depth at a desired depth.

One approach, as exemplified by U.S. Pat. Nos. 3,375,800 and 3,434,446 (of which applicant is an inventor), and also in U.S. Pat. Nos. 3,412,704; 3,496,526; 3,541,989; and 3,605,674 has used plural apparatus, each mounted in a housing about the seismic cable at spaced positions along the length of the cable. With this approach, the housing surrounding the cable tended to confine undesirable noise in the area of the cable which could be sensed by the sensing geophones or hydrophones in the seismic cable. Further, with these apparatus, the depth controlling diving planes were mounted with the apparatus at the thickest portion thereof, increasing the width or cross-section span of the apparatus. Also, if the cable were overfilled with fluid, undesirable binding between the housing and the cable often occurred.

Other apparatus, such as in U.S. Pat. Nos. 3,372,66; 3,611,975; 3,531,762; and 3,531,761 have included even larger wing structure connected at a single connector to the cable and were comparatively hard to control and unwieldy. Further, the large wing structure frequently snared marine weeds and growth and other submerged objects. Still other apparatus, such as in U.S. Pat. No. 3,434,451 have used two control vehicles, one submerged with the cable, with the other at the water surface subject to wave action and thus generally undesirable.

Finally, other depth control apparatus, such as in U.S. Pat. Nos. 2,709,981; 3,492,962; 3,199,482; 3,260,232; 3,560,912; and 2,945,469 were intended for depth control of specialized structure and not, so far as is known, readily adapted to control the depth of seismic cables.

SUMMARY OF THE INVENTION

Briefly, the present invention provides a new and improved apparatus for controlling the depth of a seismic cable. The apparatus includes a depth control means for regulating the depth of the cable having a comparator which compares the force of ambient water pressure at the depth where the cable is operating with a reference force representing the desired cable depth, a control body for containing the comparator, and diving planes which respond to the comparator to move the cable to the desired depth. A connector which includes a support shank mounted between the control body and the cable, with the diving planes mounted to the support shank, and a connecting collar to attach the support shank to the cable, mounts the control body to the cable.

The connecting collar for each support shank is preferably in the form of plural collars mounted with the support shank at spaced portions thereof, so that the connecting collars are spaced from each other along the cable to stabilize the connection between the support shank and the cable.

It is an object of the present invention to provide a new and improved apparatus for controlling the depth of a cable.

BRIEF DESCRIPTION OF THE DRAWINGS

FIGS. 5A and 5B are elevation views taken in cross-section of front and rear portions, respectively, of the apparatus of the present invention.

DESCRIPTION OF THE PREFERRED EMBODIMENT

Figure 1:
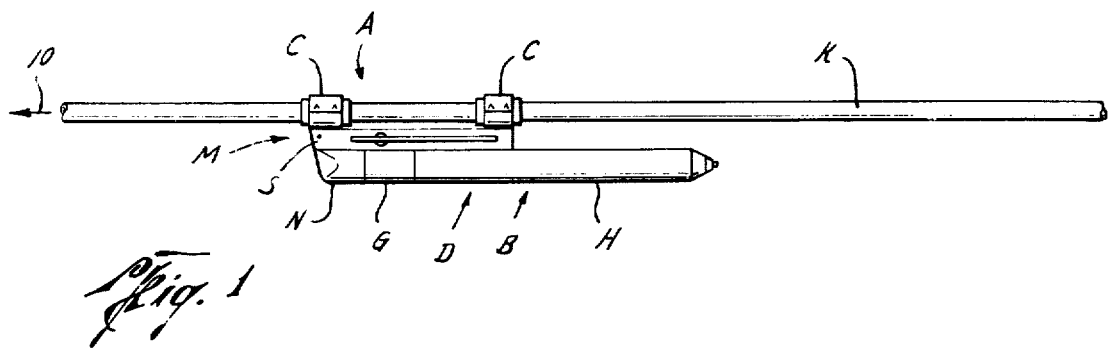
FIG. 1 is an elevation view of the apparatus of the present invention mounted with a cable.

In the drawings, the letter A designates generally the apparatus of the present invention for controlling the depth of a seismic cable K of the conventional type, formed from vinyl or other suitable material, as the cable K is towed or pulled forward through a body of water in a direction indicated by an arrow 10 (FIG. 1) behind a seismic exploration vessel of the conventional type. Typically, the cable K is filled with kerosene or suitable liquid for neutral buoyancy in the body of water and contains at spaced locations therein plural seismic signal sensing geophones or hydrophones which sense reflected seismic signals indicating the response of geological features of the area underlying the body of water to signals from a seismic source. The sensing hydrophones are connected through suitable conductors in the cable K to the vessel to permit the response of these geological features to be recorded by suitable instruments on the vessel.

Typically, the cable K is several thousand feet in length, and plural depth control apparatus A of the present invention are mounted at suitably spaced locations along the cable K to keep the cable K at substantially the same depth along its length, an important factor for accuracy in seismic surveying.

Figure 3:
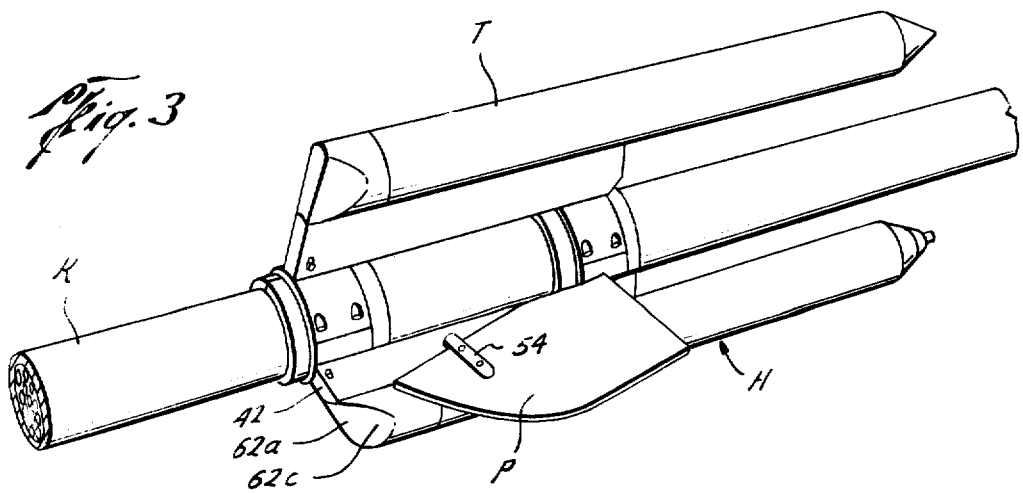
FIG. 3 is an isometric view of an alternative embodiment of the present invention.
Figure 4:
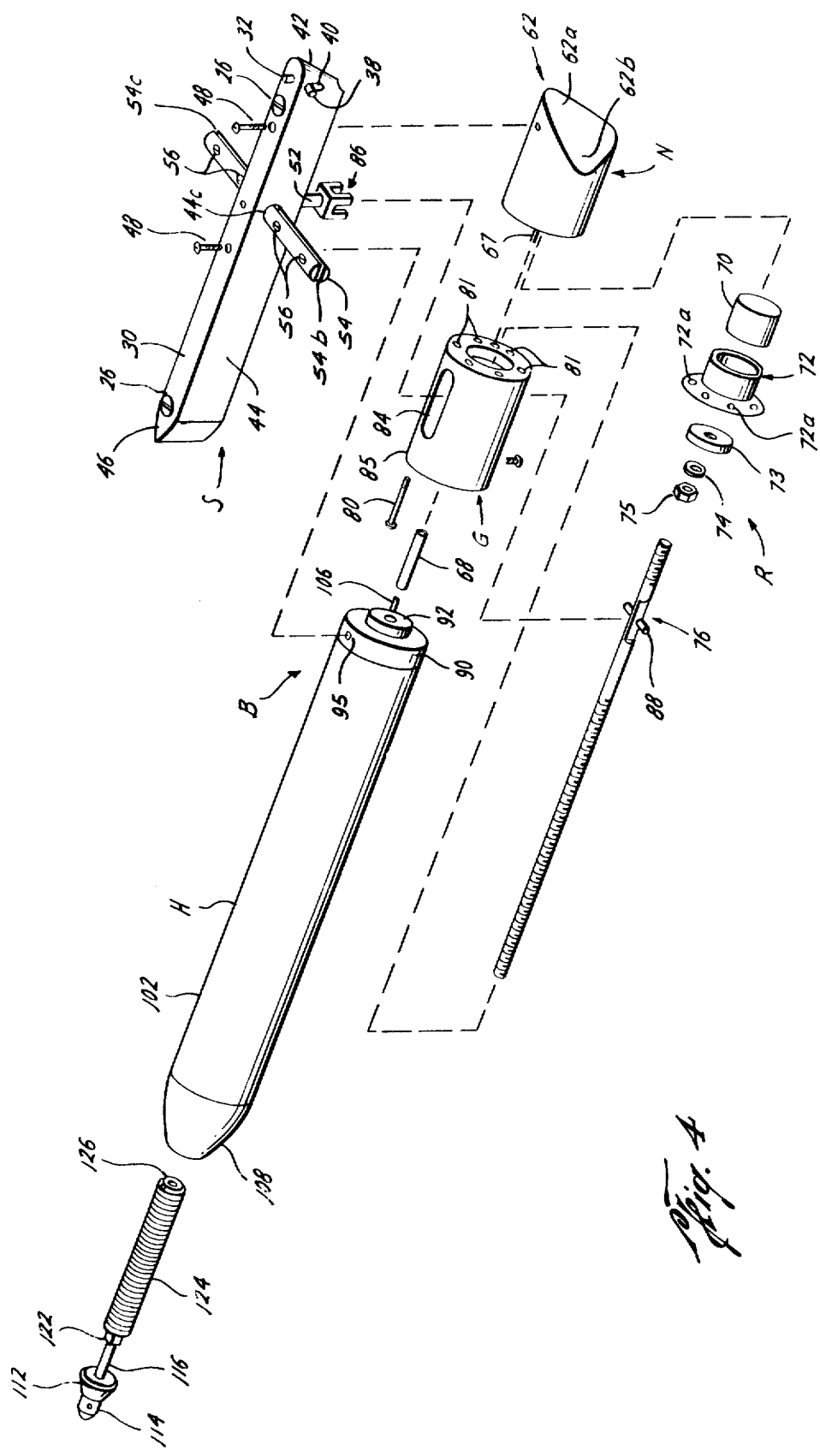
FIG. 4 is an exploded isometric view of portions of the apparatus of the present invention.

The apparatus A includes a depth control unit or assembly D, which includes a force comparator R (FIGS. 4, 5A and 5B) which compares the force of ambient water pressure at the depth at which the cable is operating with a reference force representing the desired cable depth, a control body B for containing the comparator R, and plural diving planes P (FIGS. 1–3) which respond to the comparator R and move the cable K to the desired depth.

A connector means M mounts the depth control unit D to the cable K and includes a support shank S mounted between the control body B and the cable K. The support shank S further has the diving planks P mounted therewith, for reasons to be set forth below. The connector means M further includes plural connecting collar assemblies C for attaching the support shank S to the cable K.

Considering the apparatus A more in detail, the connecting collar assemblies C (FIG. 5A) each include a cylindrical inner race 12 formed of two half-cylinder members 14 and 16 which are semi-circular in cross-section and mounted to each other by screws 18 or other suitable attaching means. The inner races 12 are mounted at desired positions with the cable K spaced from each other. The inner races 12 may be mounted with the cable K and held in place therewith by being cemented to the cable K by a suitable adhesive cement or glue or by being mounted between tape strips wrapped about the cable K at each end of such races.

The inner races 12 have a reduced diameter center section formed adjacent a surface 12a thereof, between end shoulders 12b and 12c. The center section of the inner races 12 is adapted to receive an outer race or locking collar 20.

The locking collar 20 is preferably formed of two half-cylinder members 21 and 22 which are semi-circular in cross-section and mounted to each other by screws 23 or other suitable attaching means. The locking collar 20 is freely rotatably movable with respect to the inner race 12. When the depth control unit D and the support shank S are mounted therewith, in a manner to be set forth, the weight of such structure causes such structure to ride beneath the cable K (FIG. 1).

The locking collar 20 has a pair of locking slots 24 formed therein at diametrically opposed portions thereof so that a locking pin 26 of the support shank S may be mounted therewith to mount the support shank S with the cable K.

The locking pin 26 is preferably a screw with a threaded portions 26a thereof mounted in a suitable socket 28 formed in the support shank S. The locking pin 26 has an enlarged head portion 26b extending upwardly from an upper surface 30 of the support shank S.

The locking slot 24 includes an enlarged insertion aperture or orifice formed adjacent a surface 24a formed at a forward portion of the locking slot 24 with respect to the direction of movement of the cable K. A reduced width retaining groove 24b is formed in the locking slot 24 extending rearwardly from the insertion aperture.

An enlarged slot 24c adapted to receive the head 26b of the locking pin 26 is formed inwardly in the locking collar 20 of the retaining groove 24b so that the head 26b of the locking pin 26 may be moved rearwardly in the locking slot 24 to mount the support shank S to the cable K.

A quick release lock or latch L is mounted with the support shank S adjacent the forward locking pin 26 to lock the support shank S to the connecting collars C. The lock L includes a locking dog 32 mounted in a socket 34 formed adjacent a forward end of the support shank S. The locking dog 32 is adapted to move into the locking slot 24 of the forward locking collar 20 (FIG. 5A).

A resilient spring 36 is mounted in the socket 34 beneath the locking dog 32 to urge such locking dog into a position in the locking slot 24 to prevent inadvertent forward movement of the support shank S and depth control unit D with respect to the cable K and thereby lock the support shank S and depth control unit D to the cable K.

Releasing pins 38 (FIG. 4) are mounted with the locking dog 32 extending outwardly therefrom through vertically elongated slots 40 formed in the supporting shank S. The releasing pins 38 may be gripped and moved downwardly in the slots 40 to overcome the force of the spring 36 and move the locking dog 32 out of the locking slot 24. When the locking dog 32 is removed from the locking slot 24 in this manner, the supporting shank S and the depth control unit D may be moved forward to a position where the heads 26b of the locking pins 26 pass through the apertures in the locking slot 24 so that the support shank S and depth control unit D may be dismounted and removed from the cable K.

The support shank S includes a prow or rounded leading surface 42 (FIGS. 3 and 4) sloping downwardly from an upper leading portions 42a (FIG. 5A) thereof, and a center body portion 44 and a tapered trailing end or tail portion 46 (FIG. 4) for improved hydrodynamic characteristics during movement of the apparatus A with the cable K through the water. Vertically extending sockets 44a and 44b are formed in the upper surface 30 of the center body portion 44 of the support shank S so that suitable screws 48 or other attaching means may be inserted to connect the support shank S to the control body B of the depth control unit D.

An upwardly extending cavity 50 is formed in the support shank in the center body portion 44 thereof so that a moment arm 52 may transmit motion of the comparator R of the depth control unit D to the diving plane P. A threaded upper portion 52a of the moment arm 52 is inserted into a socket in a center portion 54a of a diving plane shaft 54.

The diving plane shaft 54 is mounted in a transverse opening extending through the center body portion 44 adjacent a surface 44c and is rotatably movable with respect to the support shank S so that the diving planes P may move with respect to the support shank S in response to the comparator R to adjust the depth of the cable K, in a manner to be set forth.

The diving plane shaft 54 has receiving slots 54b and 54c formed at outer ends thereof so that the diving planes P may be inserted therein. Suitable openings are formed in the diving plane shaft 54 transverse to the receiving slots 54b and 54c so that screws 56 or other suitable attaching means may be used to mount the diving planes P to the diving plane shaft 54. It is to be noted that the diving planes P are mounted with the support shank S rather than the control body B of the diving control unit D, for reasons to be set forth.

The control body B includes a tubular spring holding accumulator assembly H, a tubular coupling member G and a cylindrical nose piece N. The accumulator assembly H, coupling member G and nose piece N are of like diameter, somewhat larger in horizontal cross-section than the width of the support shank S. Typically, the members of the control body B are 2.3 inches in diameter, while the shank S is 1 inch in width.

The nose piece N is mounted at an upper surface 58 with a lower surface 60 of the support shank S, which is curved to recieve the exterior of the tubular control body B therein, by a forward one of the mounting screws 48. The nose piece N includes a prow member 62 formed on a leading surface thereof. The prow member 62 conforms to the configuration of the leading surface 42 of the support shank S along a rearwardly sloping center portion 62a thereof, and further includes tapering side surfaces 62b and 62c formed extending outwardly and rearwardly on the front portion of the nose piece N from the center portion 62a thereof past the connection between the nose piece N and the support shank S. The prow member 62 thus extends outwardly past the mounting connection between the diving planes P and the support shank S thereby serving to deflect marine growth and debris away from the movable connection or mounting between the diving planes P and the support shank S (FIG. 3) to reduce snagging and catching of such marine growth and debris which might otherwise occur.

A piston chamber 64 is formed extending inwardly into the nose piece N. The piston chamber 64 contains air at atmospheric pressure therein and is connected by a conduit 66 formed in the nose piece N and a connector tube 67 through a coupling hose 68 to the accumulator assembly H, for reasons to be set forth.

The comparator R includes a piston 70 mounted for relative movement in the piston chamber 64 of the nose piece N. A rolling diaphragm seal 72 (FIG. 4) is mounted at a center portion thereof with the piston 70 by a diaphragm seal washer 73, with a washer 74 and a diaphragm seal mounting nut 75 used to firmly secure the seal washer 73 in place on a threaded front end of a piston rod 76. The diaphragm 72 is mounted along outer portions thereof between the nose piece N and the coupling member G by a plurality of suitable screws 80 or other suitable fastening means which pass through suitable openings 81 formed in the coupling member G and opening 72a in seal 72 into sockets formed in the nose piece N. A working chamber 82 is formed in a central portion of the coupling member G. A passage slot 84 is formed extending between an upper surface 85 of the coupling member G adjacent the chamber 50 in support shank S and the work chamber 82 in the coupling member G. The connection between the support shank S and the coupling member G adjacent the passage slot 84 permits ambient water pressure to enter the work chamber 82 so that such pressure may work against the piston 70, for reasons to be set forth.

The moment arm 52 extends from the chamber 50 through the passage slot 84 into the work chamber 82 with a yoke 86 (FIG. 4) formed at a lower end thereof mounted with connector pins 88 formed extending outwardly from the piston rod 76 at a portion rearward of the connection to the piston 70.

A forward mounting collar 90 of the accumulator assembly H is mounted along a center insertion piece 92 thereof in a rear socket adjacent a surface 94 of the coupling member G. The collar 90 has a socket formed therein adjacent a surface 95 to receive a rearward one of the mounting screws 48 and attach the accumulator assembly H to the lower surface 60 of the support shank S. The piston rod 76 extends from the working chamber 82 and the coupling member G into the accumulator assembly H through a central opening formed adjacent a surface 90a of the mounting collar 90.

A cylindrical mounting shoulder member 96 is formed extending rearwardly from the mounting collar 90 to mount therewith an inner accumulator sleeve 100 and an outer accumulator sleeve 102. The inner accumulator sleeve 100 and the outer accumulator sleeve 102 are concentrically mounted with respect to each other and form therebetween an accumulator reservoir 104 in connection through a connector tube 106, mounted in a socket formed in the collar 90, with the piston chamber 64 in the nose piece N through a connection which includes the coupling hose 68, connecting tube 67 and conduit 66.

The accumulator reservoir 104 contains air therein and receives excess air forced from the piston chamber 64 due to forward movement of the piston 70 therein. When the piston 70 moves rearwardly in the chamber 64, air passes from the accumulator reservoir 104 to the piston chamber 64 through the connection set forth above to maintain air pressure in chamber 64 substantially constant.

A rear mounting collar 108, having a forwardly extending mounting shoulder 110 formed thereon to mount therewith the inner accumulator sleeve 100 and the outer accumulator sleeve 102, seals the rear end of the accumulator reservoir 104. The mounting collar 108 has a rearwardly tapering external surface 108a formed thereon for improved hydrodynamic flow characteristics.

A rearwardly tapered fairing 112 is mounted at a rear end portion 108b of the collar 108. A depth control knob 114 having a knurled external surface 114a and a central connector opening 114b formed therein is mounted at the rear of the fairing 112. A connector screw 116 is mounted with the depth control knob 114 passing through a central opening formed in the fairing 112 adjacent a surface 112a thereof.

A rear spring mounting block 118 receives a threaded forward end 116a of the connector screw 116 therein. A washer 120 and nut 122 are mounted with the connector screw 116 to firmly secure the spring mounting block 118 with the screw 116.

The spring mounting block 118 has grooves formed along an external surface thereof so that a reference spring 124 of the comparator R may be fixedly mounted therewith along a rear portion of such reference spring. The reference spring 124 extends forwardly within the accumulator assembly H in the interior of the inner accumulator sleeve 100 to a forward spring mounting block 126 which has grooved external surfaces formed thereon to receive coils of the spring 124. The forward spring mounting block 126 has a central opening formed therein to receive a threaded rear end 128 of the piston rod 76 and mount the spring 124 at a forward portion thereof with the piston rod 76.

The reference spring 124 of the comparator R is thus mounted in the control body B between a rear end portion mounted with rear mounting block 118 and a forward portion mounted with a forward mounting block 126. The spring 124 responds to relative movement between the mounting blocks 118 and 126 by compressing or expanding.

The mounting block 118, connector screw 116 and control knob 114 connect the rear end of the spring 114 to fairing 112 of the control body B so that forces stored in the spring 124, due to relative movement between the mounting blocks 118 and 126, are exerted on the piston rod 76 and piston 70 of the comparator R attempting to move the piston rod 76 and piston 70 rearwardly with respect to the control body B.

The ambient water pressure at the depth of operation of the cable K is present in the work chamber 82 of the control body B, as has been set forth, and exerts a force on the piston 70 and seal 72 attempting to move the piston 70 forward into the piston chamber 64 of the control body B. The magnitude of the water pressure force on the piston 70 is dependent on the depth at which the cable K is operating, since ambient water pressure is proportional to depth in the water. The reservoir 104 in the accumulator assembly H permits the air pressure in the piston chamber 64 to remain substantially constant by permitting air to be forced from or drawn into the chamber 64 in response to movement of the piston 70.

The force exerted by the spring 124 on the piston rod 76 and piston 70 in opposition to the force due to ambient water pressure on the piston 70 may be adjusted to a desired magnitude by rotating the depth control knob 114, causing the threaded rod 116 to rotate, so that mounting block 118 mounted therewith rotates the spring 124 causing the forward mounting block 126 and front end of spring 124 to rotate on the threaded end 128 of the piston rod. Rotational movement of the forward mounting block 126 and front end of spring 124 in this manner causes rearward or forward relative movement of the forward mounting block 126 with respect to the rear mounting block 118 along the axis, compressing or expanding, respectively, the spring 124, increasing or decreasing the force exerted by the spring 124 on the piston rod 76.

In this manner, the force of spring 124 may be set at a reference magnitude representing that force caused by the pressure of water at the desired operating depth of the cable K working against the area of the piston 70 and seal 72. A scale or other suitable force measuring means may be connected to the apparatus A at the connector opening 114b in the depth control knob 114 for calibration of the force exerted by the spring 124.

In the operation of the present invention, the connecting collars C are mounted in pairs at suitable locations along the length of the cable K. The collars C in a pair are mounted spaced from each other a distance equal to the spacing between the locking pins 26 of the support shank S.

The depth control knob 114 for each of the apparatus A is then used to adjust the force of the reference spring 124 to correspond to the desired operating depth for the cable K during the survey.

The cable K is then passed out or played out from the vessel, typically from a reel on the vessel, as the vessel moves slowly forward, so that the cable K takes the form of an elongate streamer behind the vessel. As the cable K is being so placed, the apparatus A are then connected to the cable K with the support shank S by inserting the locking pins 26 into the insertion apertures in the locking slots 24 of locking collars 20 and sliding the apparatus rearwardly so that the lock L locks the apparatus in place on the cable K.

It is to be noted that the connecting collars C and locking pins 26 permit the apparatus A to be promptly and easily connected to and disconnected from the cable K while the cable K is being placed in or removed from the water behind the vessel, with the lock L permitting a secure locking of the apparatus A from the cable K. Further, the lock L permits quick release of the apparatus A from the cable K by depressing the releasing pins 38 and moving the shank S and depth control unit D forward with respect to the connecting collars C when such cable is being reeled into the vessel.

Once the cable K is in the water, the apparatus A maintains the cable streamer K at the desired operating depth by utilizing pressure-controlled diving planes P to apply "lift" forces to the streamer K as it is being towed by the vessel. The operating depth of the apparatus A is controlled by forces reacting on the comparator R. The spring 124 exerts a force on the piston 70 in a first direction and ambient or static water pressure exerts a force on the piston 70 in an opposite direction to the spring 124. Any unbalance of these two forces on the comparator R, such as when the cable K is not at the proper depth, causes the moment arm 52 to rotate the diving planes P through the diving plane shaft 54 to a position so that the towing movement of the cable K causes the apparatus A to move to the desired depth.

Figure 2:
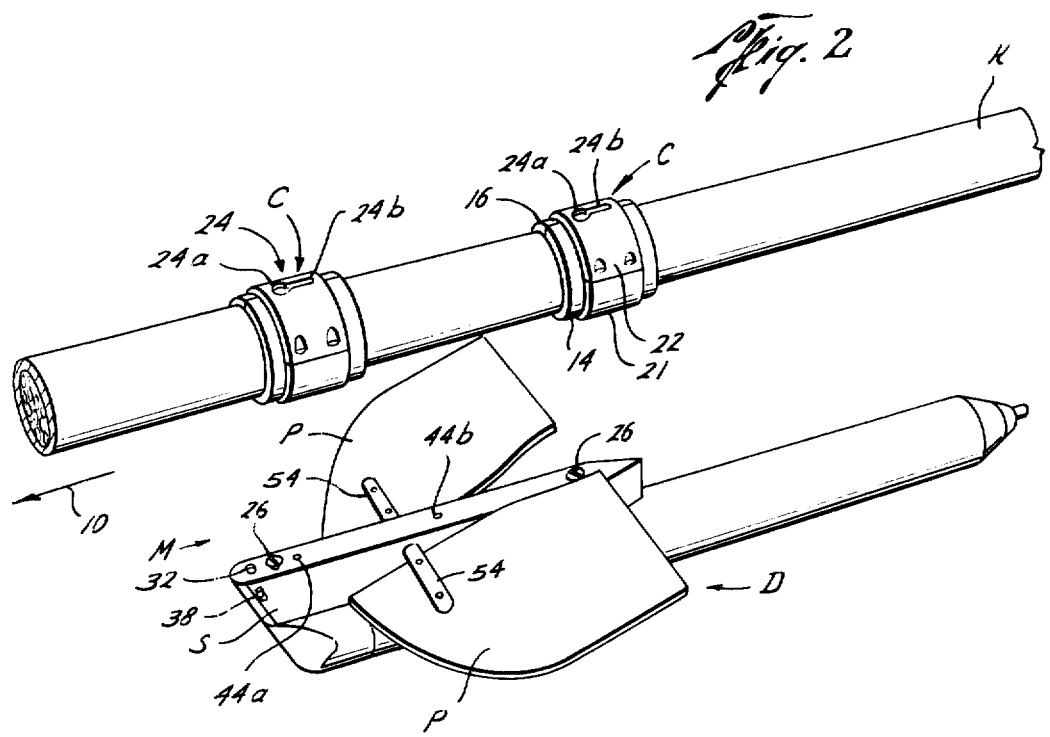
FIG. 2 is an isometric view, partially exploded, of the apparatus of FIG. 1.

When the cable K is close to the surface of the water, the spring 124 exerts a force on the piston 70 causing the diving planes P to assume a "dive" position (FIG. 2). Under tow, the apparatus A moves the cable K toward its preset depth. With increasing depth, the water pressure on the piston 70 causes a force to be exerted that approaches the magnitude of the force of the spring 124, causing the diving planes P to rotate toward a horizontal or zero "lift" position (FIG. 1). As the apparatus A reaches the preset depth the diving planes P assume their zero "lift" position and the cable K remains at the desired level unless acted upon by external vertical forces.

Should external vertical forces cause the streamer K to deviate from the preset depth, the comparator R senses this deviation and causes the diving planes P to rotate in a direction to compensate for the effect of the external force.

Due to the mounting of the diving planes P with the reduced thickness support shank S rather than the control body B and due to relatively small diameter control body B, the apparatus A moves through the water with less drag and turbulence thus reducing the noise that may be introduced into the hydrophones while the cable K is being towed through the water.

Additionally, the separation distance of the control body B from the cable K by shank S causes the turbulence and resultant noise produced by the control body B to be partially dissipated into the surrounding water, so that noise introduced into the hydrophones is reduced as contrasted to a large housing completely surrounding the cable. Also, mounting the diving planes P and diving plane shafts 54 with the support shank S with the comparator R spaced therefrom in the control body B permits use of an increased length moment arm, correspondingly increasing the amount of torque applied to the diving planes P for each movement of the piston rod 76.

Further, with the plural connecting collar assemblies C mounted at relatively spaced locations with the cable K from each other a form of precision bearing assembly is achieved, and a more stabilized and less unwieldy connection of the apparatus A to the cable K is permitted so that stabilizer fins at the rear of the control body B are not required, further reducing the drag and turbulence and attendant noise during movement through the water. Further, the connecting collars C cause the apparatus A to more closely follow the movement of the cable K, for example, when the course of the seismic vessel pulling or towing the cable K is changed.

In the event it is desirable or necessary to adjust the depth of the cable K, this adjustment can be quickly made with the control knob 114 in the manner above. Further, since the knob 114 is mounted in a position accessible externally of the control body B without requiring removal of any protective covers or disassembly of the apparatus A, this adjustment can be quickly accomplished.

In the event that the range of operating depths of the cable K is to be significantly changed, the spring 124 may be replaced by a spring having a greater (or lesser) spring constant according to the new desired range of operating depths.

In an alternative embodiment of the present invention (FIG. 3), the control body B is mounted with the cable K and operates in the manner set forth above. In addition, a flotation tube assembly T, hollow and sealed against water pressure and having no internal operating parts; and further having an external configuration corresponding to the control body B, is mounted by a support shank S, of the type set forth above, having locking pins 26, to the connecting collars C at locking slots 24 diametrically opposed from those receiving the support shank S and control body B. The flotation tube assembly T is used when neutral buoyancy of the apparatus A in the water is desired. Further, having upper and lower structure mounted to the cable K with support shanks S and connecting collars C of the type set forth, stability in the vertical plane in the presence of cross-currents or during turning of the vessel towing the cable K is provided.

Additionally, in the control body of the apparatus A the piston chamber 64 may be subjected to a substantial vacuum and evacuated, rather than pressurized with air, and a metal diaphragm used as diaphragm 72. However, the spring 124 or other suitable structure must provide the force of the atmospheric pressure on the piston 70 which is not present in evacuated chamber 64.

The foregoing disclosure and description of the invention are illustrative and explanatory thereof, and various changes in the size, shape, and materials as well as in the details of the illustrated construction may be made without departing from the spirit of the invention.

I claim:

1. An apparatus for controlling the depth in water of a seismic cable, comprising:
   a. depth control means for regulating the depth of the cable, said depth control means comprising:
      1. comparator means for comparing the force of ambient water pressure at the depth where the cable is operating and a reference force representing the desired cable depth;
      2. control body means for containing said comparator means; and
      3. diving plane means responsive to said comparator means for moving the cable to the desired depth; and
   b. connector means for mounting said depth control means to the cable, said connector means comprising:
      1. support shank means mounted between said control body means and the cable, said support shank means having said diving plane means therewith; and
      2. connecting collar means for attaching said support shank means to the cable.

2. The apparatus of claim 1, wherein said connecting collar means comprises:
   a first connecting collar mounted with a first portion of said support shank means; and
   b. a second connecting collar mounted with a second portion of said support shank means spaced along the cable from said first connecting collar to stabilize the connection between said support shank means and the cable.

3. The structure of claim 1, further including:
   a. moment arm means connecting said comparator means and said diving plane means.

4. The structure of claim 3, wherein said moment arm means comprises:
   a moment arm mounted at a first portion thereof with said comparator means in said control body and at a second portion thereof with said diving plane means in said support shank means.

5. The structure of claim 1, wherein:
   said support shank means is smaller in width than said control body means along an axis transverse a longitudinal axis of the cable wherein the lateral span of said diving plane means is reduced.

6. The structure of claim 5, further including:
   a prow member formed on a leading rod of said control body, said prow member deflecting marine growth and debris away from the mounting of said diving plane means with said support shank means to reduce snagging and catching of such marine growth and debris by the apparatus.

7. An apparatus for controlling the depth in water of a seismic cable, comprising:
   a. depth control means for regulating the depth of the cable, said depth control means comprising:
      1. comparator means for comparing the force of ambient water pressure at the depth where the cable is operating and a reference force representing the desired cable depth;
      2. control body means for controlling said comparator means; and
      3. diving plane means responsive to said comparator means for moving the cable to the desired depth; and
   b. connector means for connecting said depth control means to the cable, said connector means comprising:
      1. support shank means mounted between said control body means and the cable, said support shaft having said diving plane means therewith;
      2. connecting collar means for attaching said support shank means to the cable, said connecting collar means including a locking slot formed therein, and
      3. quick release locking means for locking said support shaft means to said connecting collar means, said quick release locking means comprising:
         a locking dog adapted to move in said locking slot in said connecting collar means,
         resilient means for urging said locking dog into said locking slot in said connecting collar means; and
         releasing pin means for removing said locking dog from said locking slot.

8. An apparatus for controlling the depth in water of a seismic cable, comprising:
   a. depth control means for regulating the depth of the cable, said depth control means comprising:
      1. comparator means for comparing the force of ambient water pressure at the depth where the cable is operating and a reference force representing the desired cable depth;
      2. control body means for containing said comparator means; and
      3. diving plane means responsive to said comparator means for moving the cable to the desired depth; and
   b. connector means for mounting said depth control means to the cable, said connector means comprising:
      1. support shank means mounted between said control body means and the cable, said support shank means having said diving plane means therewith;
      2. connecting collar means for attaching said support shank means to the cable;

3. quick release locking means for locking said support shank means to said connecting collar means, said quick release locking means including locking pin means having an enlarged head portion formed therewith; and
4. said connecting collar means including a locking slot formed therein, said locking slot including an insertion aperture for receiving said head portion of said locking pin, and a confining groove extending from said insertion aperture in a direction opposite the direction of cable movement to retain said locking pin therein.

9. An apparatus for controlling the depth in water of a seismic cable, comprising:
   a. depth control means for regulating the depth of the cable, said depth control means comprising:
      1. comparator means for comparing the force of ambient water pressure at the depth where the cable is operating and a reference force representing the desired cable depth, wherein said comparator means comprises:
         means responsive to the ambient water pressure;
         reference means for exerting the reference force representing the desired depth on said means responsive to the ambient water pressure; and
         adjusting means for adjusting the reference force exerted by said reference means on said means responsive to the ambient water pressure;
      2. control body means for controlling said comparator means;
      3. diving plane means responsive to said comparator means for moving the cable to the desired depth; and
      4. said adjusting means comprising a depth control knob formed extending outwardly from said control body means whereby the desired depth of the cable may be rapidly adjusted without disassembling the apparatus; and
   b. connector means for mounting said depth control means to the cable.

10. The structure of claim 9, wherein said means responsive to the ambient water pressure comprises a piston.

11. The structure of claim 9, wherein said reference means of said comparator means comprises a spring.

12. The structure of claim 9, wherein said connector means comprises:
   a. support shank means mounted between said control body means and the cable, said support shank means having said diving plane means therewith; and
   b. connecting collar means for attaching said support shank means to the cable.

* * * * *